H. B. COATS.
VEHICLE WHEEL.
APPLICATION FILED SEPT. 7, 1916.
1,266,408.
Patented May 14, 1918.
5 SHEETS—SHEET 2.
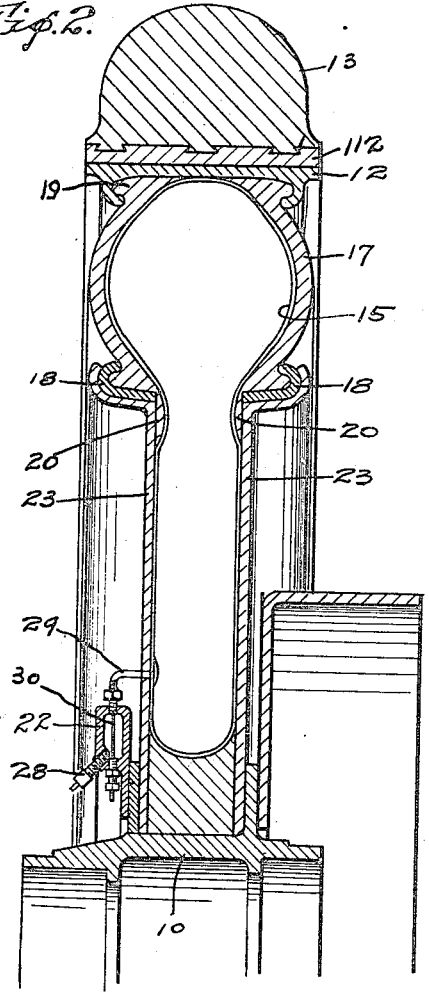
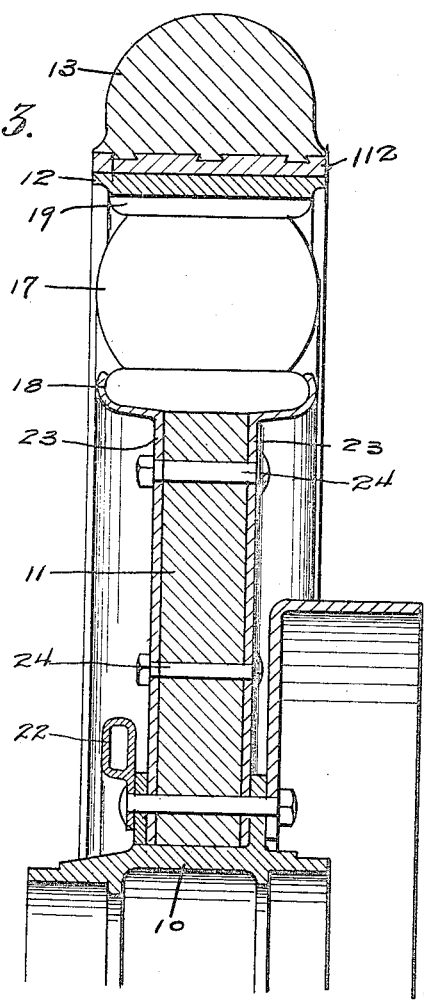
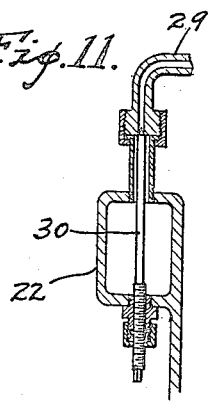
INVENTOR
HENRY B. COATS
BY
ATTORNEYS

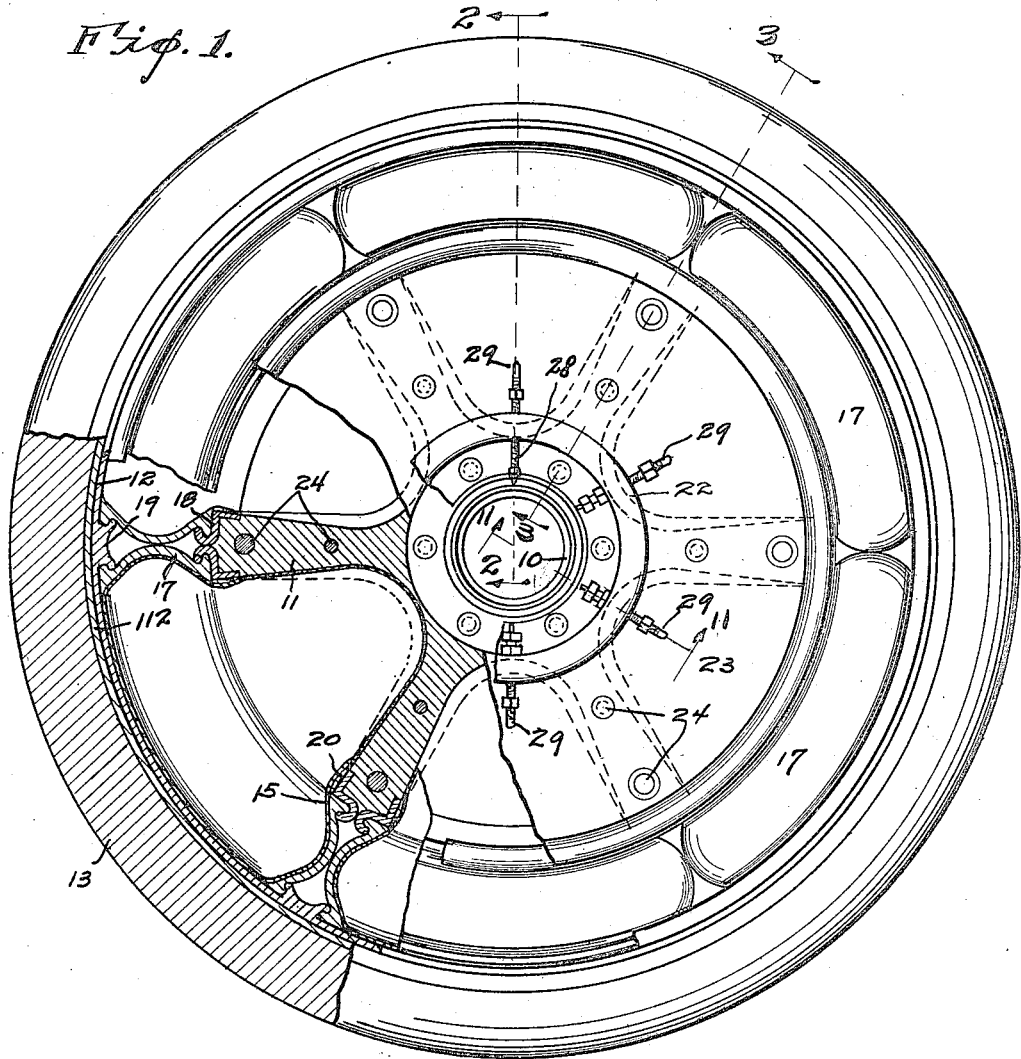

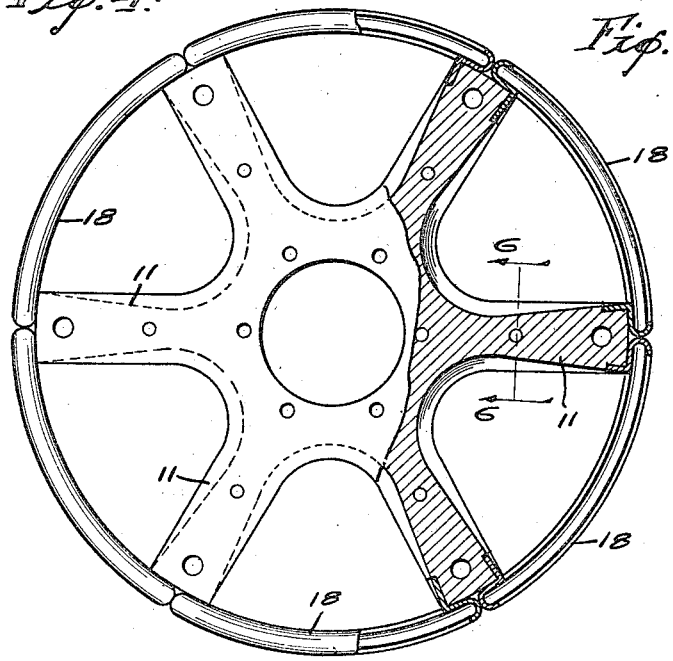
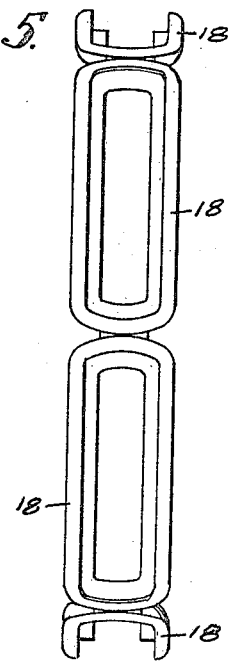
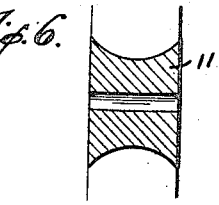
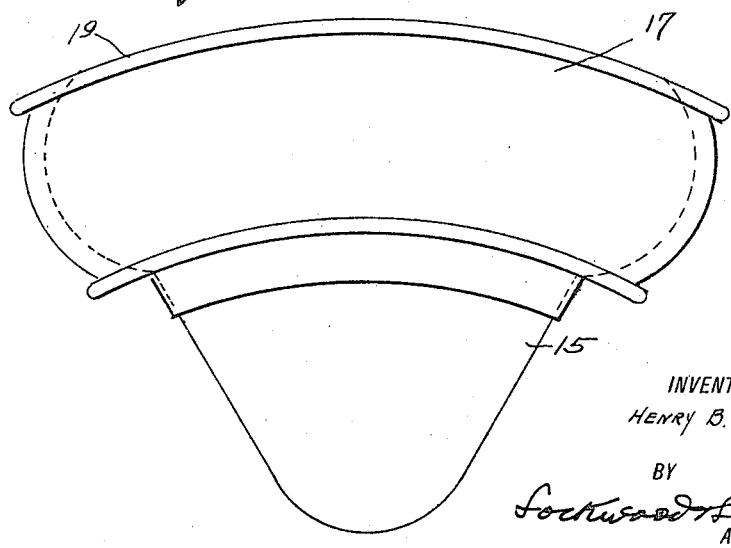

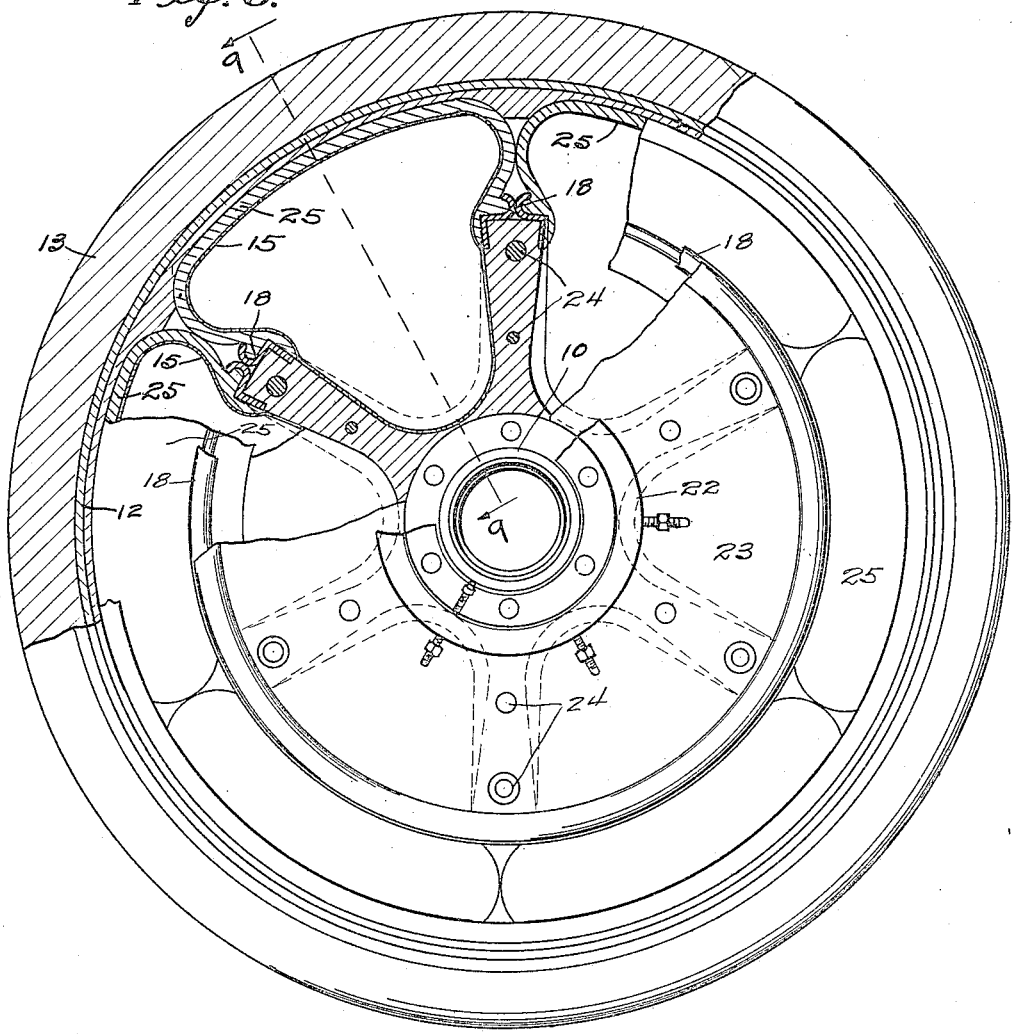

H. B. COATS.
VEHICLE WHEEL.
APPLICATION FILED SEPT. 7, 1916.
1,266,408.
Patented May 14, 1918.
5 SHEETS—SHEET 5.
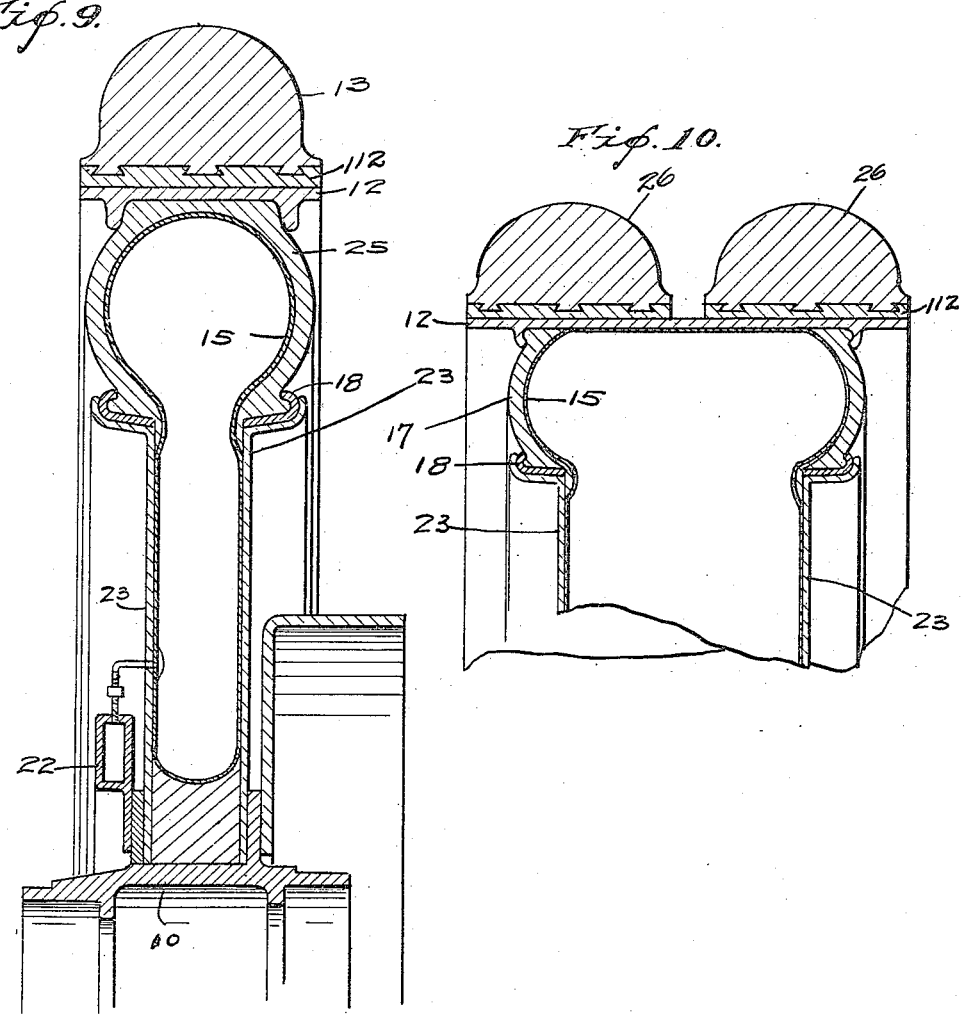
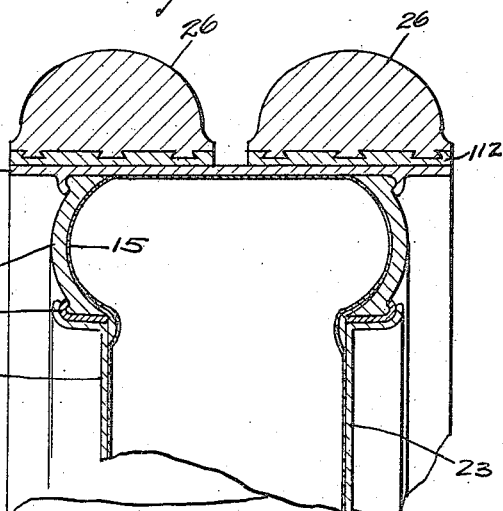
INVENTOR
Henry B. Coats
BY
Lockwood & Lockwood
ATTORNEYS

UNITED STATES PATENT OFFICE.

HENRY B. COATS, OF VEEDERSBURG, INDIANA.

VEHICLE-WHEEL.

1,266,408.   Specification of Letters Patent.   Patented May 14, 1918.

Application filed September 7, 1916. Serial No. 118,856.

*To all whom it may concern:*

Be it known that I, HENRY B. COATS, a citizen of the United States, and a resident of Veedersburg, county of Fountain, and State of Indiana, have invented a certain new and useful Vehicle-Wheel; and I do hereby declare that the following is a full, clear, and exact description thereof, reference being had to the accompanying drawings, in which like letters refer to like parts.

The object of this invention is to provide a practical and efficient cushioned vehicle wheel capable of having a solid rim which will not be injured by punctures that render the ordinary pneumatic tired wheels so objectionable. Efforts have been made by many to solve this difficult problem but without complete success, because, usually, there is sufficient resiliency or responsiveness in wheels having pneumatic cushions therein located away from the tire so as to be punctured. One trouble has been in such devices that there was not sufficient air under compression in the pneumatic cushions to afford the desired resiliency and attain the desired responsiveness.

One feature of this invention consists in providing pneumatic cushions which extend practically the entire distance from the hub to the rim. Preferably there is a cushion between each pair of spokes and extending for the full distance between said spokes and for the full distance between the hub and the tire, and having as great thickness as is practical in a vehicle wheel. This gives to pneumatic cushions in vehicle tires located away from the rim, so as to be punctureless, the greatest possible capacity.

The foregoing and other features of this invention and the advantages thereof will be understood from the accompanying drawings and following description and claims.

In drawings Figure 1 is a side elevation of the vehicle wheel with a portion thereof in section. Fig. 2 is a transverse section through a portion of said wheel on line 2—2 of Fig. 1. Fig. 3 is a transverse section through a portion of said wheel on line 3—3 of Fig. 1. Fig. 4 is a side elevation of said wheel with the side plate, rim, tire, and pneumatic cushion omitted, and a portion thereof being in section. Fig. 5 is a plan view of Fig. 4. Fig. 6 is a section through a spoke on line 6—6 of Fig. 4. Fig. 7 is an elevation of the pneumatic cushion. Fig. 8 is a side elevation of a modified form of vehicle wheel with a portion thereof broken away. Fig. 9 is a transverse section on a line 9—9 of Fig. 8. Fig. 10 is a section similar to the upper portion of Fig. 9, but showing a modified form. Fig. 11, is a central vertical cross section through the air valve passage.

There is shown herein a wheel having a hub 10, short spokes 11, which do not extend to the rim 12, a detachable rim 112 and a solid rubber tire 13. The parts 10, 11, 12 and 112 are preferably made of metal. These parts form two members or portions of the wheel, that may be called the hub portion and the rim portion, and they are maintained in their relation to each other by a number of pneumatic cushions 15 interposed between the two members and between the spokes of the hub members, as seen in Fig. 1. Each pneumatic cushion extends for the full distance from the hub to the rim and from one spoke to the next. There is sufficient space between the ends of the spokes and the rim to permit ample vibratory movement between the hub member and rim member of the wheel while the wheel is in use, and without any danger of these two members of the wheel coming in contact with each other, so that the hub member floats always within the rim member and the rim member is always yieldingly supported on the hub member, by said pneumatic cushions.

Each pneumatic cushion 15 may be said to have two portions or parts, one tapering portion which fits between the spokes and another, a segmental portion, which lies adjacent the rim and extending circumferentially from the end of one spoke to the end of the next spoke. The inner or tapering portion of each pneumatic cushion needs no covering or outer casing, but lies immediately against the spokes. This is possible because the inner surfaces of the spokes are concave in cross section as shown in Fig. 6 so as to furnish a smooth seat or recess for the cushion. But a covering or protection between said end of the cushion and the spokes may be provided if desired.

The outer or segmental portion of the cushion is largely covered and protected by an outer casing 17, made of the same material substantially as is used in making outer casings for the ordinary pneumatic tires.

These outer casings 17 are rather peculiar in shape, being shaped somewhat like a link of a chain so as to fit in the clencher rims 18, which are shown in Fig. 5. Said outer casings therefore consist of only end and side portions, the end portions lying between the ends of the spokes and the clencher rims 18, secured thereto, and the tire and the clencher rims 19 thereon, as is clearly shown in Fig. 1. The sides of said outer casing extend between the ends shown in Fig. 1 adjacent the ends of two spokes. These side portions are shown in elevation by full lines in Fig. 1. The outer casings 17 are provided with a bead along the inner edge to fit in the clencher rims 18 on the ends of the spokes and a bead along the outer edge to fit in the clencher rims 19 of the rim 12 of the wheel. This effectually holds the cushion in place and in connection with the two other members of the wheel. The outer surface of each pneumatic cushion lies against the inner surface of the rim 12, unless it be desired to have some protection between them, although none is needed.

Packing 20 is secured to each clencher rim 18 where it turns the corner on the end of the spoke for the purpose of protecting the pneumatic cushion 15 from such sharp corner. In other words, the end of each spoke is wrapped around a suitable wrapping 20 to form this packing. The cushions are supplied with compressed air through air chamber 22 secured to the hub and this preferably is a single means for supplying air to all of the cushions so that the air pressure in them will be uniform. Side plates 23 are secured to the spokes by bolts 24 and extend from the hub to the outer portion of the pneumatic cushions as seen in Fig. 2, the outer part of each plate being curved to fit snugly against the clencher rims 18.

In a modified form shown in Figs. 8 and 9, the outer casing 25 is provided for entirely covering all parts of the outer portion of the pneumatic cushion and lying between said cushion and the rim, and also protecting the cushion from the corners of the clencher rims 18.

The modified form shown in Fig. 10 widens the wheel so as to enable it to use a plurality of solid rubber tires 26 as shown, to increase the traction.

From the foregoing description it is evident that the pneumatic cushions herein have ample capacity for sufficiently yielding under a load and yielding very quickly so as to be sufficiently responsive and thereby render the wheel as satisfactory in operation as the pneumatic tired wheel, and yet have a solid tire free from the objections of the pneumatic tire. The pneumatic cushions are so mounted and held in place that they cannot escape and can not wear or cut on the surfaces by which they are held in place and fit snugly against the spokes and rim so that there is no chance for them to escape or have needless play or movement.

The air chamber 22 is provided with an air valve 28 as seen in Fig. 2 for use in charging the air chamber and air cushions and it will prevent the escape of any air therefrom. Tube 29 leads from said air chamber 22 to each cushion and there is a positive needle valve 30 for controlling the passage of air through pipe 29. The passages 29 to all of the air cushions are open while charging the cushions. When they are charged, it is better to close valves 30 so that each cushion will be independent of each other and yet of uniform pressure. Therefore, if one air cushion should leak or break, the other cushion would remain inflated and the wheel could be operated until a suitable repair place could be reached. At intervals, say once a day or once every three days, the pressure in these cushions may be made uniform by opening all of the needle valves 30 for a minute or two and then the valves may be closed.

The invention claimed is:

1. A vehicle wheel including a rim, a hub with spokes radiating therefrom but not extending to the rim, a pneumatic cushion filling the space between each pair of spokes and extending to the rim, and flexible means secured to the ends of the spokes for holding a portion of each cushion which extends beyond the spokes to the rim.

2. A vehicle wheel including a rim, a hub and spokes radiating therefrom but not extending to the rim, the inner surface of said spokes being concave, pneumatic cushions between each pair of spokes seated in the concave surfaces thereof and extending beyond the ends of the spokes to the rim, and flexible means secured to the ends of the spokes for holding in place the portion of each cushion extending beyond the ends of the spokes.

3. A vehicle wheel including a rim having clenching means on the inner surface thereof, a hub and radiating spokes which do not extend to the rim, a clenching plate secured to the ends of each pair of spokes and extending segmentally between them, and opposite each clenching means on the rim, a pneumatic cushion lying in the space between each pair of spokes and extending beyond the same to the rim, and an outer casing surrounding the outer portion of each cushion and secured to a clencher plate.

4. A vehicle wheel including a rim, a hub and spokes which do not extend to the rim, a pneumatic cushion between each pair of spokes and extending beyond the same to the rim, an outer casing surrounding the outer portion of the cushion, clenching means secured to the outer ends of the spokes for holding said outer casing in place, and means covering the portion of the clenching means adjacent to the end of each spoke for protecting the pneumatic cushion from wear.

5. A vehicle wheel including a rim, a hub and spokes radiating therefrom but not extending to the rim, pneumatic cushions between each pair of spokes and extending beyond the ends of the spokes to the rim, and flexible means secured to the ends of the spokes and rim for holding in place the portion of each cushion extending beyond the ends of the spokes, and side plates secured to the spokes and extending to the ends thereof and having peripheral flanges overlapping the clenching means secured to the ends of the spokes.

6. A vehicle wheel including a rim, a hub and radiating spokes which do not extend to the rim, clenching means secured to the outer ends of the spokes and extending between said spokes, a series of pneumatic cushions between the rim and spokes, each cushion extended to fill the space between the adjacent pair of spokes, and an outer casing secured to the clenching means on the spokes for surrounding and protecting the outer portion of each cushion, the ends of said outer casings abutting successively against each other.

7. In a vehicle wheel having a hub and radiating spokes extending therefrom, clenching means secured to the outer ends of the spokes and extending between said spokes, a series of pneumatic cushions adapted to extend to fill the space between the adjacent pair of spokes, and outer casings secured to the clenching means on the spokes for surrounding and protecting the outer portion of each cushion, the ends of said outer casings abutting successively against each other.

In witness whereof, I have hereunto affixed my signature.

HENRY B. COATS.

Copies of this patent may be obtained for five cents each, by addressing the "Commissioner of Patents, Washington, D. C."